United States Patent
Taylor

(10) Patent No.: US 8,130,139 B2
(45) Date of Patent: Mar. 6, 2012

(54) RADAR-BASED METHOD FOR MEASURING A LEVEL OF MATERIAL IN A CONTAINER

(75) Inventor: Andrew James Taylor, Cumbria (GB)

(73) Assignee: Siemens Aktiengesellschaft, Munich (DE)

( * ) Notice: Subject to any disclaimer, the term of this patent is extended or adjusted under 35 U.S.C. 154(b) by 393 days.

(21) Appl. No.: 12/437,010

(22) Filed: May 7, 2009

(65) Prior Publication Data

US 2009/0278730 A1    Nov. 12, 2009

(30) Foreign Application Priority Data

May 9, 2008   (EP) .................................... 08008780

(51) Int. Cl.
*G01S 13/08* (2006.01)
(52) U.S. Cl. ........................................................ 342/124
(58) Field of Classification Search ................... 342/124
See application file for complete search history.

(56) References Cited

U.S. PATENT DOCUMENTS

| | | | |
|---|---|---|---|
| 5,504,490 A | | 4/1996 | Brendle et al. |
| 5,614,911 A | * | 3/1997 | Otto et al. ..................... 342/124 |
| 5,734,346 A | * | 3/1998 | Richardson et al. .......... 342/124 |
| 5,948,979 A | | 9/1999 | Fitsch et al. |
| 6,626,038 B1 | | 9/2003 | Carsella et al. |
| 7,518,548 B2 | * | 4/2009 | Edvardsson ................... 342/124 |
| 7,999,725 B2 | * | 8/2011 | Feisst et al. ................... 342/124 |
| 8,040,274 B2 | * | 10/2011 | Wendler et al. ............... 342/124 |
| 8,044,843 B2 | * | 10/2011 | Baath ............................ 342/124 |
| 2004/0201516 A1 | * | 10/2004 | Lyon ............................. 342/124 |
| 2006/0132351 A1 | * | 6/2006 | Le Sesne ....................... 342/124 |
| 2007/0139256 A1 | * | 6/2007 | Edvardsson ................... 342/124 |
| 2008/0034863 A1 | * | 2/2008 | Bartoli et al. ............... 73/290 R |
| 2008/0143583 A1 | * | 6/2008 | Welle et al. ................... 342/124 |
| 2009/0278730 A1 | * | 11/2009 | Taylor ........................... 342/124 |

FOREIGN PATENT DOCUMENTS

EP         2116819 A1 * 11/2009
WO    WO 2008080840 A    7/2008

* cited by examiner

*Primary Examiner* — John Sotomayor

(57) ABSTRACT

Described is a radar-based method for measuring a level of material in a container. Microwaves are emitted to a surface of the material by a radar level gauge, echo waves reflected from the surface are received and the received echo waves are converted into an echo function which is stored and evaluated to establish a useful echo and to determine a position of the echo. The echo function is generated and stored with a first higher resolution for a selected first portion of the entire level measurement range of the radar level gauge. Further, the echo function is generated and stored with a second lower resolution or no echo function is generated and stored for the remaining second portion of the entire level measurement range.

11 Claims, 4 Drawing Sheets

RADAR-BASED METHOD FOR MEASURING A LEVEL OF MATERIAL IN A CONTAINER

CROSS REFERENCE TO RELATED APPLICATIONS

This application claims priority of European Patent Application No. 08008780.2 EP filed May 9, 2008, which is incorporated by reference herein in its entirety.

FIELD OF INVENTION

The invention relates to a radar-based method for measuring a level of material in a container.

BACKGROUND OF INVENTION

For radar-based level measurement all known methods may be employed which permit distances to be measured by means of reflected microwaves, the best-known examples of which are pulsed radar and frequency modulated continuous wave radar (FMCW radar). In pulsed radar short microwave transmission pulses are emitted periodically which are reflected by the object being measured and re-received as an echo signal after a transit time depending on the distance involved. The received signal amplitude versus time function constitutes an echo function or echo profile. Every value of this echo function corresponds to the amplitude of an echo due to reflection at a certain distance from the antenna. In FMCW radar a continuous microwave is emitted which is periodically linearly frequency-modulated, for example, according to a saw-tooth function. The frequency of each received echo signal thus exhibits with respect to the instantaneous frequency which the transmission signal has at the time of reception, a difference in frequency which depends on the transit time of the echo signal. The difference between the frequency of the transmission signal and that of the reception signal which may be obtained by mixing both signals and evaluating the Fourier spectrum of the mixed signal, thus corresponds to the distance of the reflecting surface of the object away from the antenna, and the level of the frequency characteristic corresponds to the magnitude of the echo amplitude. This Fourier spectrum, therefore, constitutes the echo function in this case. In prior art the entirety of the echo function obtained in the course of a measurement cycle is stored and then the stored echo function is evaluated according to a given program by a computer to establish the useful echo and to determine the transit time of the useful echo. Storing the echo function in this case is preferably done in digitized form by the echo function being periodically sampled, each sampled value being converted by an analog-to-digital converter into a digital code group and the digital code groups being written into a RAM of the computer.

SUMMARY OF INVENTION

Current radar level gauges waste time and power by always measuring over the entire measuring range and with the same resolution or accuracy.

According to the invention this problem is solved by a radar-based method as claimed in the independent claim.

Preferred embodiments of the invention are defined in the dependent claims.

The invention thus comprises a radar-based method for measuring a level of material in a container, comprising:
emitting microwaves to a surface of the material by means of a radar level gauge;
receiving echo waves reflected from the surface of the material using said radar level gauge;
converting the received echo waves into an echo function over time and storing the echo function;
evaluating the stored echo function to establish a useful echo and to determine the position of the useful echo,
wherein the echo function is generated and stored with a first higher resolution for a selected first portion of the entire level measurement range of the radar level gauge and
wherein the echo function is generated and stored with a second lower resolution or no echo function is generated and stored for the remaining second portion of the entire level measurement range.

The range and resolution of the radar level gauge are variable and are focused on the selected first portion of the entire level measurement range where the useful echo may be expected or has been last determined. Once the useful echo has been detected, the first portion of the level measurement range is preferably centered around it. If the remaining second portion of the entire level measurement range of the radar level gauge is of no measurement interest, the generation, storing and evaluation of the echo function is limited solely to the first portion thus saving storing capacity and processing power and providing faster measurement. Otherwise, the echo function is generated and stored with a second lower resolution for the remaining second portion of the entire level measurement range. With the storage capacity being unchanged, the first higher resolution may be increased to the extent that the second lower resolution is decreased.

If there are two independent echoes of interest, the first useful echo is preferably established in one of two consecutive measurement cycles, whereas the other echo is established in the other measurement cycle by generating, storing and evaluating another echo function with said first or another higher resolution for a selected third portion of the entire level measurement range of the radar level gauge and wherein the other echo function is generated and stored with said second or another lower resolution or no echo function at all is generated and stored for the remaining forth portion of the entire level measurement range. Here too, the third portion of the level measurement range is preferably centered around the last determined position of the other useful echo.

BRIEF DESCRIPTION OF THE DRAWINGS

The invention will be now described in more detail with reference to preferred embodiments shown by way of non-limiting example in the attached drawings, wherein.

DETAILED DESCRIPTION OF INVENTION

Figure 1:
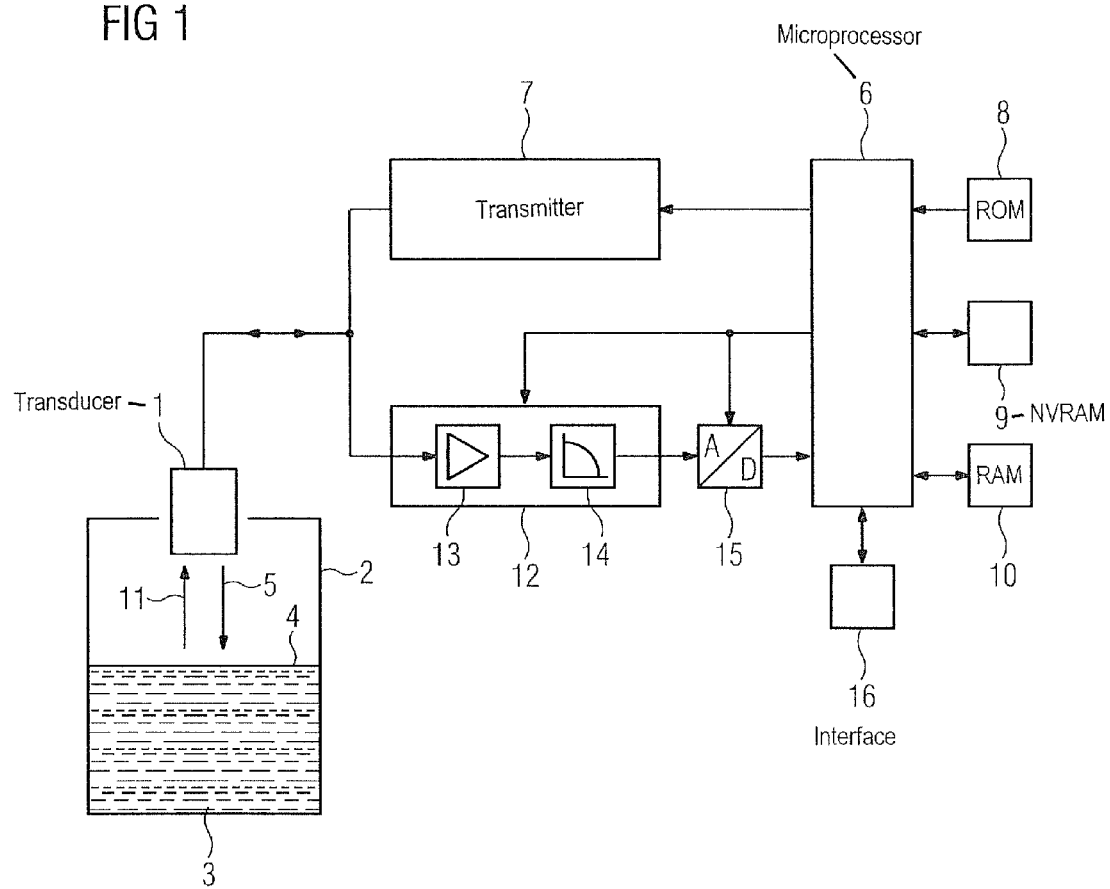
FIG. 1 is a schematic of a pulse radar level gauge.

Referring to FIG. 1, which is a simplified schematic diagram, a pulse radar level gauge comprises a microwave transducer 1 which is installed in a tank 2 containing a liquid or other type of material 3, with a level determined by the top surface 4 of the material 3. The top surface 4 of the material 3 provides a reflective surface which reflects microwave pulses 5 generated from the transducer 1. The transducer 1 is coupled to a microprocessor 6 through a transmitter 7. The microprocessor 6 operates under a control program stored in read-only memory (ROM) 8, utilizing parameters stored in non-volatile random access memory (NVRAM) 9, and provided with a working memory in the form of random access memory (RAM) 10.

The microprocessor 6 controls the transmitter 7 to excite the transducer 1 to emit the microwaves pulses 5 at predetermined points in time and with predetermined frequency and amplitude. The reflected or echo pulses 11 are received by the transducer 1 and converted to an electric signal which is then fed to a receiver 12. The receiver 12 comprises an amplifier 13 and an envelope detector 14. The output from the envelope detector 14 is then sampled and digitized by an analog-to-digital converter 15, from where the digital echo profile is stored in the RAM 10 for further processing by the microprocessor 6. Alternatively, the raw signal from the transducer 1 may be sampled and digitized before being envelope-detected The microprocessor 6 executes an algorithm to identify the true echo 11 from the surface 4 of the material 3 and calculate the range of the reflective surface 4, i.e. the time it takes for the echoes 11 to travel from the reflective surface 4 to the transducer 1. From this calculation, the distance to the surface 4 of the material 3 and thereby the level of the material 3 is determined. An interface 16, controlled by the microprocessor 6, provides for the export of level-related data and the import of operating parameters. Data may be exported in the form of a display, telemetry (e.g. bus) signals, and/or alarm signals.

Figure 2:
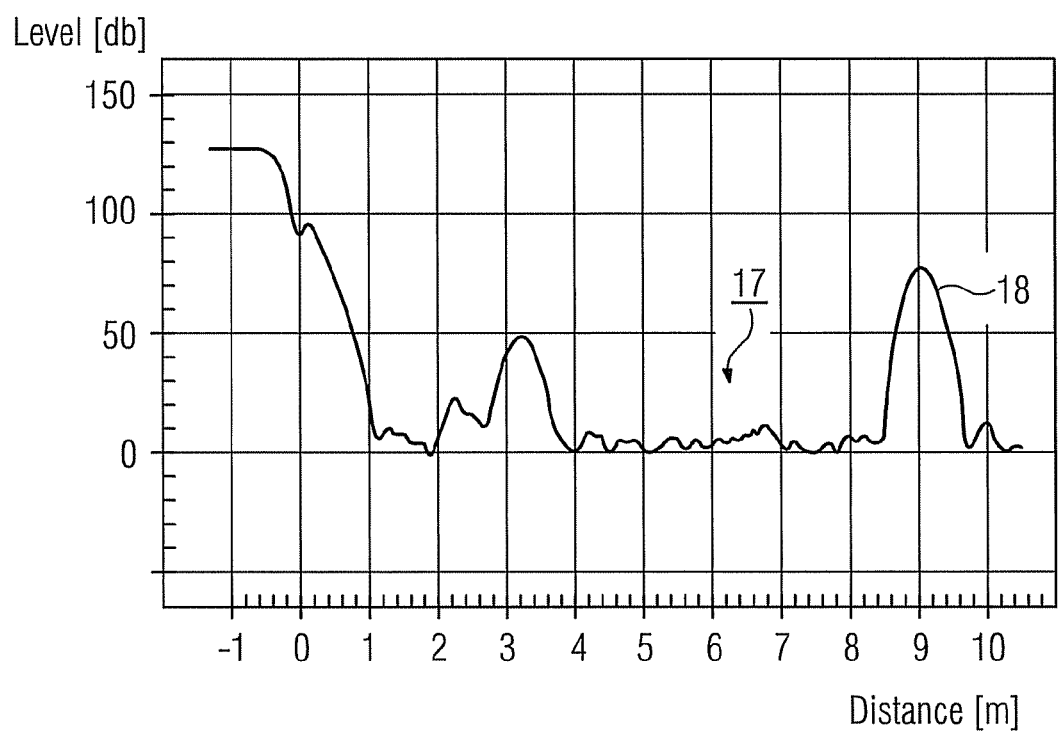
FIG. 2 shows an echo function recorded in a conventional manner over the entire level measurement range of the radar level gauge.

FIG. 2 shows a typical echo function 17 recorded in a conventional manner over the entire level measurement range of the radar level gauge. Many existing algorithms to identify a wanted echo in an echo function are well-known and well-documented and need not be described in more detail here. In the shown example, the true echo 18 from the top surface 4 of the material 3 is found at a distance of 9.00 m. As is apparent from FIG. 2, recording and evaluating of the echo function 17 in the range between 0 m and approx. 8 m wastes measurement time and power.

Figure 3:
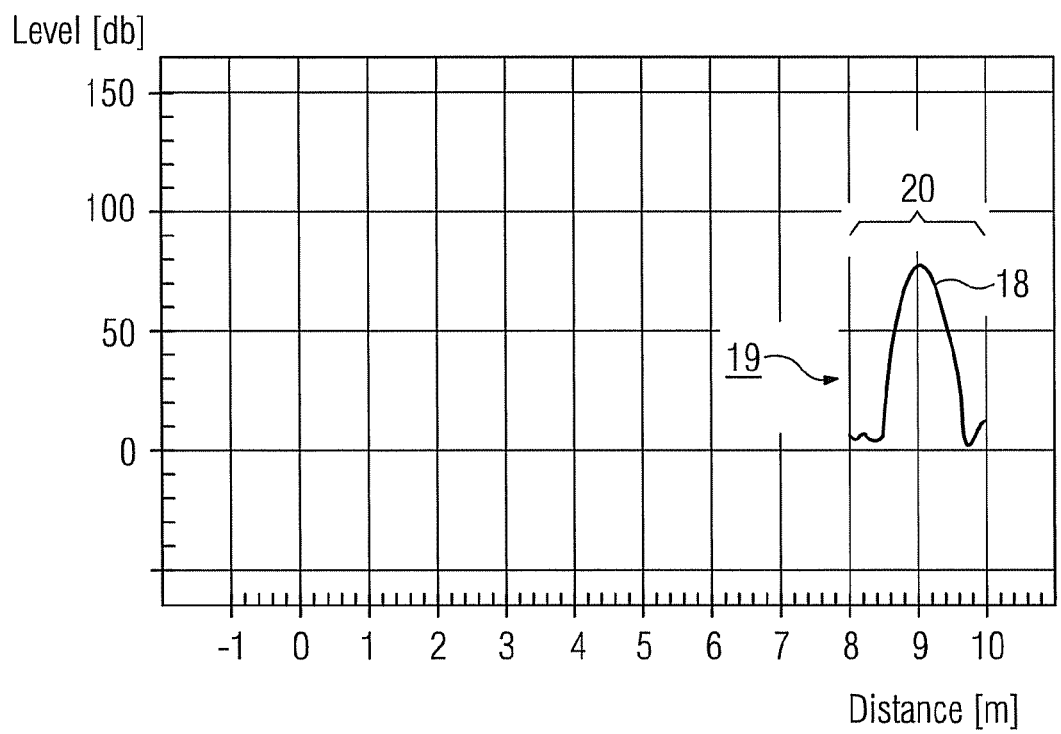
FIG. 3 shows an echo function recorded according to a first embodiment of the invention.

FIG. 3 shows the echo function 19 recorded according to a first embodiment of the invention. The range and resolution of the radar level gauge are variable and are focused on a selected first portion or window 20 of the entire level measurement range. The window 20 is positioned where the useful echo 18 may be expected or has been last determined. Once the useful echo 18 has been detected, the window 20 of the level measurement range is centered around it. For the remaining second portion of the entire level measurement range, here the range from 0 m to 8 m and beyond 10 m, no echo function is generated. This will consume less power by only activating the receiver 12 for a short time and will provide faster measurements. At the same time, the resolution can be increased without requiring additional storage capacity since it is focused on only a portion 20 of the entire level measurement range Alternatively, e. g. for surveillance reasons, the echo function may be generated and stored for said remaining second portion with a lower resolution than that for the window 20.

Figure 4:
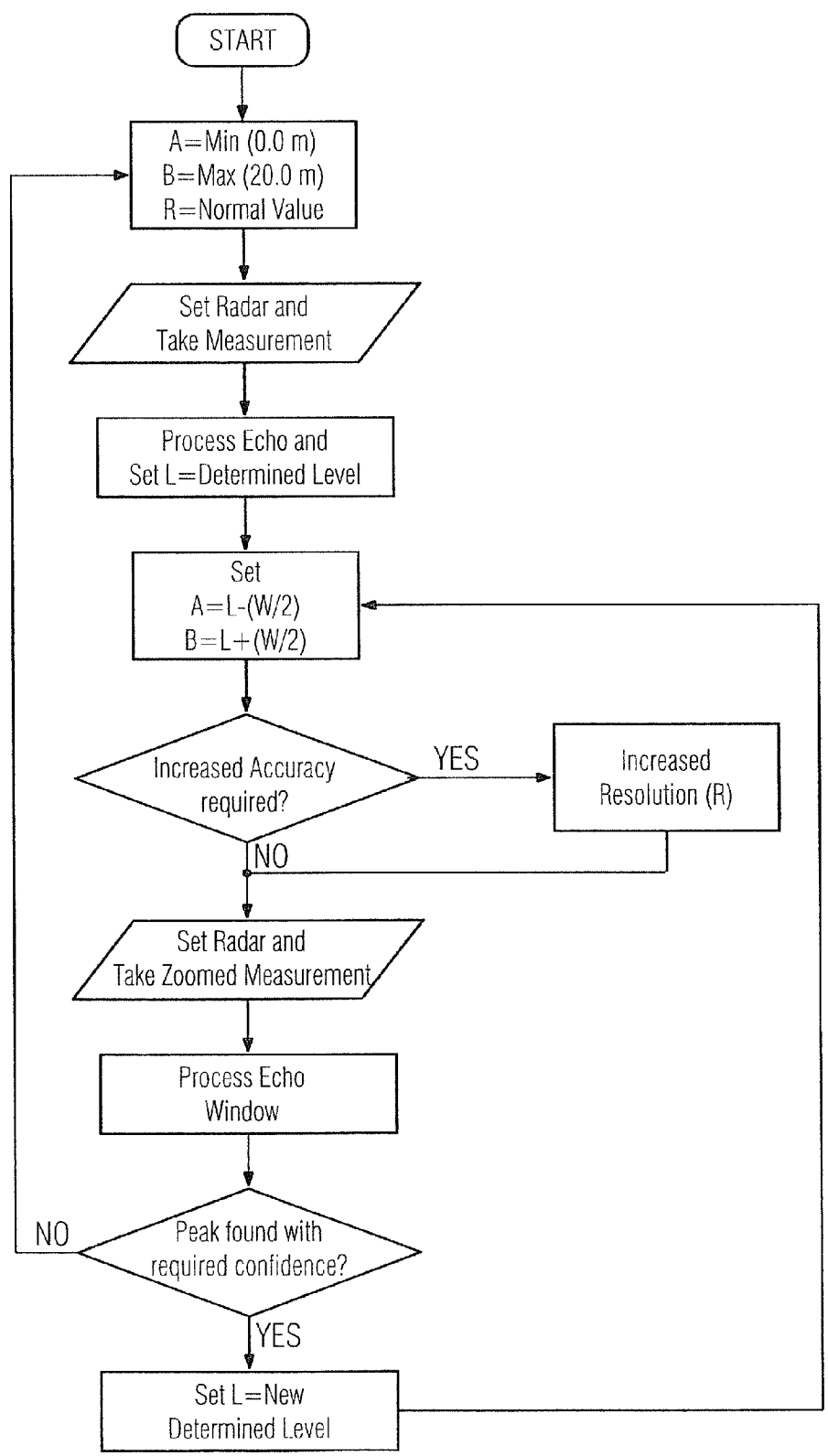
FIG. 4 is a flow chart illustrating an algorithm used in the first embodiment of the invention.

Referring to FIG. 4, there will now be described an example of an algorithm executed by the microprocessor 6 to control the radar level gauge. The steps of the algorithm are:

1. The initial measuring range is set to the entire level measurement range of the radar level gauge with start point A=Min=0 m and stop point B=Max=20 m. The measurement resolution R is set to an initial value R=normal value.

2. A measurement is taken, the echo function 17 is recorded and evaluated over the entire level measurement range and the wanted echo 18 is identified at a distance (level) L.

3. The start point and stop point are set to A=L−(W/2) and B=L+(W/2), where W=2 m is a predetermined width of the window 20.

4. If required, the value of the measurement resolution R is increased.

5. A new measurement is taken and the echo function 19 is recorded and evaluated over the window 20.

6. If the wanted echo 18 is identified within the window 20 at a distance $L_{new}$, the distance (level) is set to $L=L+L_{new}$ and the algorithm is continued at step 3.

7. If the wanted echo 18 cannot be identified within the window 20, the algorithm is continued at step 1.

Figure 5:
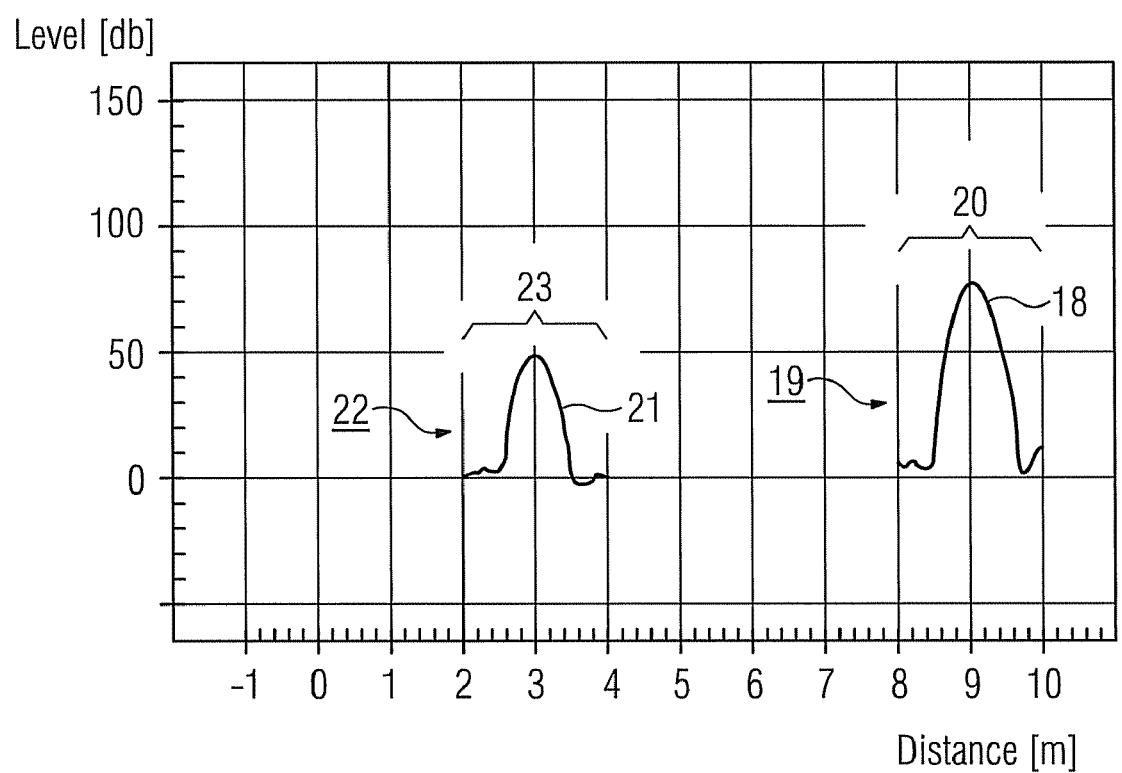
FIG. 5 shows an echo function recorded according to a second embodiment of the invention.

FIG. 5 illustrates another example of the invention, where two different targets in the tank 2 are tracked. The wanted echo 18 from the first target (e. g. the top surface 4 of the material 3) is identified in a first of two consecutive measurement cycles, as already described with reference to FIGS. 3 and 4. In the same way, the other echo 21 from the second target (e. g. a stirrer) is established in the second measurement cycle by generating, storing and evaluating another echo function 22 for another selected portion (window) 23 of the entire level measurement range of the radar level gauge. It is also possible to record both echo functions 19 and 22 within the windows 20 and 23 in a single measurement cycle.

Although described above with particular reference to a pulse radar level gauge, the present invention may equally be used in other radar level gauges such as FMCW radar.

The invention claimed is:

1. A radar-based method for measuring a level of material in a container, comprising:
    emitting microwaves to a surface of the material by a radar level gauge;
    receiving echo waves reflected from the surface of the material using the radar level gauge;
    converting the received echo waves into an echo function over time;
    storing the echo function; and
    establishing a useful echo and determining a position of the useful echo by evaluating the stored echo function;
    wherein the echo function is converted and stored with a first higher resolution for a selected first portion of the entire level measurement range of the radar level gauge, and
    wherein the echo function is converted and stored with a second lower resolution or no echo function is converted and stored for the remaining second portion of the entire level measurement range.

2. The method according to claim 1, wherein the first portion of the entire level measurement range is centered around the last determined position of the useful echo.

3. The method according to claim 2, wherein the useful echo is established in one of two consecutive measurement cycles.

4. The method according to claim 3, further comprising:
    establishing another useful echo in the other measurement cycle of the two consecutive measurement cycles by converting, storing and evaluating another echo function with the first or another higher resolution for a selected third portion of the entire level measurement range of the radar level gauge and wherein the other echo function is converted and stored with the second or another lower resolution or no echo function is converted and stored for a remaining fourth portion of the entire level measurement range.

5. The method according to claim 4, wherein the third portion of the level measurement range is centered around the last determined position of the other useful echo.

6. The method according to claim 1, wherein the useful echo is established in one of two consecutive measurement cycles.

7. The method according to claim 6, further comprising:
establishing another useful echo in the other measurement cycle of the two consecutive measurement cycles by converting, storing and evaluating another echo function with the first or another higher resolution for a selected third portion of the entire level measurement range of the radar level gauge and wherein the other echo function is converted and stored with the second or another lower resolution or no echo function is converted and stored for a remaining fourth portion of the entire level measurement range.

8. The method according to claim 7, wherein the third portion of the level measurement range is centered around the last determined position of the other useful echo.

9. A pulse radar level gauge, comprising:
a microwave transducer configured to generate microwave pulses, the microwave transducer being arranged in a tank containing a material and a top surface of the material providing a reflective surface to reflect the microwave pulses;
a transmitter;
a microprocessor, the microwave transducer being coupled to the microprocessor via the transmitter, and the microprocessor controlling the transmitter to excite the microwave transducer to emit the microwave pulses;
a receiver configured to receive an electric signal based upon reflected microwave pulses or echo pulses, the receiver having an amplifier and an envelope detector; and
a converter configured to generate a digital echo profile,
wherein the microprocessor executes an algorithm to identify a true echo from the top surface of the material and to calculate a range of the reflective surface.

10. The pulse radar level gauge according to claim 9, wherein the microprocessor operates under a control program stored in a read-only memory (ROM), utilizing parameters stored in non-volatile random access memory (NVRAM) and provided with a working memory being a random access memory (RAM).

11. The pulse radar level gauge according to claim 9, further comprising:
an interface controlled by the microprocessor for an export of data and an import of operating parameters.

* * * * *